United States Patent [19]

Nappier et al.

[11] Patent Number: 5,332,709
[45] Date of Patent: Jul. 26, 1994

[54] STABILIZED AQUEOUS SOLUTIONS FOR PREPARING CATALYSTS AND PROCESS FOR PREPARING CATALYSTS

[75] Inventors: Thomas E. Nappier, Parma; Michele A. Glink, Vienna, both of Ohio

[73] Assignee: OM Group, Inc. (Mooney Chemicals, Inc.), Cleveland, Ohio

[21] Appl. No.: 34,721

[22] Filed: Mar. 22, 1993

[51] Int. Cl.$^5$ .................. B01J 37/16; B01J 37/02; B01J 27/185; B01J 27/19
[52] U.S. Cl. .................................... 502/211; 502/210
[58] Field of Search ...................... 502/210, 211

[56] References Cited

U.S. PATENT DOCUMENTS

| | | | |
|---|---|---|---|
| 3,232,887 | 2/1966 | Pessimisis | 502/211 X |
| 3,287,280 | 11/1966 | Colgan et al. | 502/211 |
| 3,493,517 | 2/1970 | Jaffe | 502/211 |
| 3,544,452 | 12/1970 | Jaffe | 502/211 X |
| 3,546,105 | 12/1970 | Jaffe | 502/211 X |
| 3,696,027 | 10/1972 | Bridge | 208/210 |
| 3,755,150 | 8/1973 | Mickelson | 502/211 X |
| 3,755,196 | 8/1973 | Mickelson | 502/211 |
| 3,830,731 | 8/1974 | Reed et al. | 208/211 |
| 3,840,472 | 10/1974 | Colgan et al. | 502/211 |
| 4,179,404 | 12/1979 | Barone | 502/209 |
| 4,396,500 | 8/1983 | Simpson | 208/216 R |
| 4,689,314 | 8/1987 | Martinez et al. | 502/210 |
| 4,818,743 | 4/1989 | Simpson et al. | 502/211 |
| 4,886,582 | 12/1989 | Simpson | 502/211 |
| 5,021,384 | 6/1991 | Hatano et al. | 502/210 X |

*Primary Examiner*—Paul Lieberman
*Assistant Examiner*—Douglas McGinty
*Attorney, Agent, or Firm*—Renner, Otto, Boisselle & Sklar

[57] ABSTRACT

A stabilized aqueous solution for use in preparing catalysts is described which comprises water, at least one Group VIB element, at least one Group VIII element, an inorganic phosphorus-containing acid, and an amount of a reducing agent effective to dissolve the Group VIB and Group VIII elements and stabilize the solution. Examples of useful reducing agents include hydrazine compounds and hydroxylamine compounds. A method of preparing catalysts utilizing the stabilized aqueous solutions also is described and comprises (A) impregnating a foraminous carrier with an aqueous solution comprising water, at least one Group VIB element, at least one Group VIII element, an inorganic phosphorus-containing acid, and an amount of a reducing agent effective to dissolve the Group VIB and Group VIII elements and stabilize the solution wherein said Group VIB and Group VIII elements are present as salts capable of converted to their oxides upon calcination; and (B) thereafter drying and calcining the impregnated carrier to convert the Group VIB and Group VIII elements to their oxides.

27 Claims, No Drawings

5,332,709

STABILIZED AQUEOUS SOLUTIONS FOR PREPARING CATALYSTS AND PROCESS FOR PREPARING CATALYSTS

TECHNICAL FIELD

This invention relates to stabilized aqueous solutions useful in preparing catalysts. More particularly, the invention relates to aqueous solutions containing catalytically active compounds which are useful in impregnating catalyst carriers and to a process for preparing catalysts.

BACKGROUND OF THE INVENTION

Catalysts containing metals of Group VIB of the Periodic Table (IUPAC version), especially tungsten and molybdenum and their compounds, especially the oxides or the sulfides exhibit desirable activity in catalyzing a wide variety of reactions including among others, hydrogenation, dehydrogenation, oxidation, desulfurization, isomerization and cracking. Additional metals or their compounds have been combined with the Group VIB metals to provide enhanced catalytic activity. Among the metals utilized in combination with the Group VIB metals are metals of Group VIII of the Periodic Table such as iron, cobalt, nickel and copper or their compounds. Catalysts may be prepared from these mixtures of metals and metal compounds by preparing dilute solutions and applying the diluted solutions to the surface of a foraminous support material. The foraminous support material is usually of a low order of activity when compared to the catalytically active metals or compounds mentioned above, or the support material may be completely inactive catalytically. After the carder is impregnated with the solutions, the impregnated carrier is calcined and/or chemically treated to convert the catalytically active material to other forms and particularly to the oxide. One advantage of this method of preparing catalysts is that the active material present in the solution is evenly distributed over the available surface of the foraminous carrier material.

One of the problems which results when attempts are made to prepare solutions of mixtures of Group VIB and Group VIII metals or metal compounds is the difficulty of preparing solutions and, more particularly, solutions which are stable over a period of time.

U.S. Pat. No. 3,232,887 describes stabilized aqueous catalytically active solutions which comprise an aqueous solvent having dissolved therein catalytically active compounds containing at least one element from Group VIB, at least one element from Group VIII of the Periodic Table, and a stabilizing material which is a water-soluble acidic compound. The water-soluble acidic compound may be a hydroxy monocarboxylic acid, a polyhydroxy monocarboxylic acid, a hydroxy polycarboxylic acid, a polyhydroxy polycarboxylic acid, a monocarboxylic acid, or an oxygenated inorganic phosphorus-containing acid. Among the phosphorus-containing organic acids which are suggested as being useful are hypophosphorus acid, metaphosphorus acid, phosphoric acid, metaphosphoric acid, etc.

Other patents which describe the use of inorganic phosphorus-containing acids in solutions of Group VIB and Group VIII metals or compounds include U.S. Pat. Nos. 3,287,280, 3,755,150, 3,755,196 and 4,818,743. Some of these patents describe the ratio of phosphorus to one or more of the other metals as being an important consideration for improved solubility.

SUMMARY OF THE INVENTION

A stabilized aqueous solution for use in preparing catalysts is described which comprises water, at least one Group VIB element, at least one Group VIII element, an inorganic phosphorus-containing acid, and an amount of a reducing agent effective to dissolve the Group VIB and Group VIII elements and stabilize the solution. A method of preparing catalysts utilizing the stabilized aqueous solutions also is described and comprises (A) impregnating a foraminous carrier with an aqueous solution comprising water, at least one Group VIB element, at least one Group VIII element, an inorganic phosphorus-containing acid, and an amount of a reducing agent effective to dissolve the Group VIB and Group VIII elements and stabilize the solution wherein said Group VIB and Group VIII elements are present as salts capable of convened to their oxides upon calcination; and (B) thereafter drying and calcining the impregnated carrier to convert the Group VIB and Group VIII elements to their oxides.

DESCRIPTION OF THE PREFERRED EMBODIMENTS

The catalytically active components from Group VIB elements include chromium, molybdenum and tungsten. Because of availability, relatively low cost and high activity, molybdenum and tungsten are preferred, and molybdenum is the most preferred of the Group VIB elements.

The catalytically active elements from Group VIII which may be included in the solutions of the present invention include iron, cobalt, nickel, palladium, platinum, etc. Of these, the most preferable are cobalt and nickel.

As noted, the Group VIB and Group VIII elements or metals used to prepare the solutions may be any one or a combination of a variety of substances which have sufficient solubility in the solution to enable the deposition of the desired amount of metal. Illustrative compounds of the Group VIB metals include acids, oxides, and the simple and complex salts such as molybdenum trioxide, molybdic acid, ammonium dimolybdate, ammonium phosphomolybdate, ammonium heptamolybdate, nickel and cobalt containing molybdates and phosphomolybdates, etc. The Group VIII metal sources generally are salts of strong acid anions, etc.; these include anions such as carbonate, nitrate, sulfate, halides, etc. The nitrates and carbonates are presently the preferred source of the Group VIII metal, and nickel nitrate and carbonate are particularly preferred examples. Specific combinations of Group VIB and Group VIII metals include: tungsten and nickel; tungsten and cobalt; molybdenum and nickel; molybdenum and cobalt; molybdenum, cobalt and nickel; tungsten, cobalt and nickel; etc.

The inorganic phosphorus-containing acid utilized in the aqueous solutions of the present invention may be selected from a variety of substances. Examples of useful phosphorus-containing acidic compounds include hypophosphorous acid, orthophosphorous acid, metaphosphorous acid, hypophosphoric acid, phosphorous acid, phosphoric acid, metaphosphoric acid and pyrophosphoric acid. A preferred phosphorus-containing acid is orthophosphoric acid, the normal tribasic acid of pentavalent phosphorus.

The stabilized aqueous solutions of the present invention also contain a reducing agent (solubilizer) which is effective to dissolve the Group VIB and Group VIII elements and to stabilize the solution thus formed. In the absence of a reducing agent, the Group VIB and Group VIII elements often do not dissolve; and a homogeneous solution is not obtained. A variety of reducing agents can be used as solubilizers and stabilizers for the solutions of the invention. Examples of compositions which may be used as reducing agents include hydrazine compounds; hydroxylamine compounds; formic acid; oxalic acid; citric acid; alkali metal, alkaline earth metal, and ammonium salts of formic acid, oxalic acid and citric acid; hydrogen peroxide; ascorbic acid, sodium borohydride; methylethylketoxime; and mixtures of two or more thereof.

The hydrazine compounds which are useful in this invention may be characterized by the formula

$$R_1N(H)-N(R_2)R_3 \qquad (I)$$

wherein $R_1$, $R_2$ and $R_3$ are each independently hydrogen, hydrocarbyl or hydroxy hydrocarbyl groups. Preferably, at least one of $R_1$, $R_2$ and $R_3$ are hydrogen. When each of $R_1$, $R_2$ and $R_3$ is hydrogen, the solubilizer is hydrazine. When one or more of $R_1$, $R_2$ and $R_3$ is hydrocarbyl or a hydroxy hydrocarbyl group, the solubilizer is a substituted hydrazine. The corresponding hydrazine hydrates also may be used to prepare the solutions of the present invention. Although unsubstituted hydrazine ($N_2H_4$) is preferred for reasons of economy and availability, and aqueous hydrazine is preferred for reasons of economy, efficiency and safety, substituted hydrazines (either symmetrical or unsymmetrical) with one or more hydrocarbon or hydroxy hydrocarbon groups are also suitable. As used herein, the term "hydrocarbyl group" refers to alkyl, cycloalkyl, aryl, alkaryl and aralkyl groups. The hydrocarbyl groups may contain other groups which are non-hydrocarbon substituents which do not detract substantially from the hydrocarbon character of the group (e.g., ether, ester, nitro or halogen groups). Such groups are referred to herein as substantially hydrocarbon groups, and these are considered to be equivalent to the corresponding hydrocarbon groups and to be part of this invention.

Examples of substituted hydrazines include methyl hydrazine, N,N-dimethyl hydrazine, N,N'-dimethyl hydrazine, phenyl hydrazine, N-phenyl-N'-ethyl hydrazine, N-(p-tolyl)-N'-(n-butyl)hydrazine, N-(p-nitrophenyl)-N-methyl hydrazine, etc.

Various salts of the above-described hydrazine and hydrazine compounds may be utilized and these include, for example, hydrazine acetate, hydrazine monohydrate, hydrazine dihydrochloride, hydrazine monohydrochloride, hydrazine sulfate, etc.

The reducing agent may also be a hydroxylamine compound including hydroxylamine and salts thereof. Examples of hydroxylamine salts include hydroxylamine chloride ($H_2NOH\cdot HCl$), hydroxylamine phosphate (($H_2NOH)_3\cdot H_3PO_4$) and hydroxylamine sulfate (($H_2NOH)_2\cdot H_2SO_4$).

The amounts of the various components contained in the aqueous solutions of the invention may vary over a wide range depending on the ultimate use of the catalyst prepared from the solutions. In one embodiment, the stabilized aqueous solutions of the present invention will contain from about 10 to about 30 weight percent of the Group VIB element and from about 1 to about 10 weight percent of the Group VIII element. In general, the amount of Group VIB element and Group VIII element in the solution should be sufficient to provide a catalyst containing a total metal content of from about 10% to about 35%, and in one preferred embodiment, the total metal content of the catalyst is from about 15% to about 35% by weight based on a total catalyst weight. In a further embodiment, the total metal content may be from about 20% to about 30%.

The relative amount of the Group VIB metal and Group VIII metal present in the catalyst also may be important depending upon the use of the catalyst. Thus, the atomic ratio of the Group VIB metal to the Group VIII metal is generally maintained within the range of from about 0.5:1 to about 2:1. In another embodiment, the atomic ratio of the Group VIB metal to the Group VIII metal is in the range of from about 1:1.5 to about 2:1. In yet another embodiment, the weight ratio of the Group VIB element to the Group VIII element may range from about 1:0.2 to about 1:1.

The amount of inorganic phosphorus-containing acid included in the solution may also vary over a wide range. Generally, the solutions will contain from about 5 to about 15 or 20 weight percent of the inorganic phosphorus-containing acid. In one embodiment, the amount of the inorganic phosphorus acid included in the solution will be at least about 0.2 mole of the phosphorus acid per mole of the Group VIB metal, and generally, the solution will contain from about 0.2 to about 0.8 mole of phosphoric acid per mole of Group VIB metal.

In some embodiments, the relative amounts of metals and phosphorus may be significant. In one such embodiment, the weight ratio of Group VIB:Group VIII:P should be in the range of from about 7 to 9:2 to 4:1 to 3. In one particular embodiment, the weight ratio of Group VIB:Group VIII:P is about 8:3:1.8. A specific example of such a weight ratio is 8 Mo:3 Ni:1.8 P.

The amount of the reducing agent included in the aqueous solutions of the present invention is an amount which is sufficient to insure that the Group VIB and Group VIII elements are dissolved to form a homogeneous solution, and the amount of the reducing agent should also be sufficient to stabilize the solution and maintain the homogeneity of the solution over an extended period of time until the solution is utilized to form a catalyst. Only small amounts of the reducing agent are required, and this amount may be referred to as a catalytic amount. For example, the stabilized aqueous solutions of the present invention may contain from about 0.01 to about 10 weight percent of the reducing agent. When the reducing agent is a hydrazine, the solutions generally will contain from about 0.05 to about 0.5 weight percent or more of the hydrazine. When the reducing agent is a hydroxylamine compound, the stabilized solution generally will contain from about 1 to about 6% by weight or more.

In preparing the solutions, the method of addition of the compounds containing the elements of Group VIB and Group VIII is not critical. In one embodiment utilizing hydrazine as the reducing agent, the hydrazine is added last. In another embodiment, the Group VIB compound may be added to an aqueous solution of the phosphorus-containing acid followed by the addition of a reducing agent. When all of the Group VIB element has dissolved, the Group VIII element may be added. Additional amounts of the reducing agent may be added to dissolve any solids which are difficult to dissolve. In another embodiment, the Group VIII element containing compound is added to aqueous phosphoric acid followed by the addition of the reducing agent before the Group VIB metal compound is added. The aqueous solutions of the present invention may be prepared by mixing the various components at room temperature or at elevated temperature. Generally, elevated temperatures up to the reflux temperature of the mixture are preferred.

The following examples illustrate the preparation of the stabilized aqueous solutions of the present invention. Unless otherwise indicated in the following examples and elsewhere in the specification and claims, all parts and percentages are by weight, temperatures are in degrees Centigrade and pressures are at or near atmospheric pressure.

EXAMPLE 1

A reaction vessel is charged with 22 grams of water and 5.07 grams of phosphoric acid, and the reaction vessel is equipped with a stirrer and reflux condenser. This solution is heated to about 70°–80° C. (160°–180° F.). Molybdenum trioxide (9.2 grams) is added to the solution with stirring and the suspension is milky gray in color. After about 20 minutes, the suspension develops a milky green color. When the solution has become milky green, 0.75 gram of hydroxylamine phosphate is added to the suspension. When the mixture in a vessel becomes dark blue, 6.90 grams of nickel carbonate (34% nickel) are added. The mixture is heated until all of the solid is in solution. A small amount of hydroxylamine phosphate may be added to dissolve any remaining solid. The solution obtained in this manner is the desired stabilized solution.

EXAMPLES 2–6

In these examples, the procedure of Example 1 generally is repeated except that the amount of hydroxylamine phosphate added to the milky green suspension is varied. The amount of hydroxylamine phosphate added and the total time to obtain the desired solution are summarized in the following table.

| Example | Hydroxylamine Phosphate (Grams) | Reaction Time (Hours) |
| --- | --- | --- |
| 2 | 2.69 | 3.00 |
| 3 | 2.30 | 2.50 |
| 4 | 1.36 | 2.25 |
| 5 | 0.70 | 4.00 |
| 6 | 0.69 | 4.15 |

EXAMPLE 7

A reaction vessel is charged with 220 grams of water and 60 grams of 75% phosphoric acid. The mixture is heated to 70°–80° C. (160°–180° F.) whereupon 72 grams of nickel carbonate (32% nickel) are added to the mixture followed by the addition of about 1.5 grams of hydrazine. After the nickel carbonate dissolves, 94 grams of molybdenum trioxide are added. The molybdenum trioxide dissolves in the solution. A small amount of hydrazine may be added to the mixture to dissolve any remaining solids.

EXAMPLE 8

A reaction vessel is charged with 220 grams of water and 60 grams of 75% phosphoric acid. The mixture is heated to 70°–80° C. whereupon 94 grams of molybdenum trioxide are added to the phosphoric acid solution followed by 1.3 grams of hydrazine. The molybdenum trioxide is dissolved after about 30 minutes. Nickel carbonate (72 grams) then is added and it dissolves in the solution. The solution thus obtained is the desired product.

EXAMPLE 9

The procedure of Example 7 is repeated except that a nickel carbonate is replaced by an equivalent amount of cobalt carbonate.

EXAMPLE 10

The procedure of Example 7 is repeated except that the nickel carbonate is replaced by an equivalent amount of nickel nitrate hexahydrate.

Catalysts, including hydrodesulfurization and hydrotreating catalysts can be prepared utilizing the stabilized aqueous solutions of the present invention by techniques known to those skilled in the art. In one embodiment, the catalyst of the invention can be prepared by impregnating a foraminous carder with the stabilized aqueous solutions of the present invention, and thereafter drying and calcining the impregnated carrier. Generally, one impregnation step is sufficient to provide a catalyst containing the desired metal content although in some instances, particularly at higher levels of metals, multiple impregnation steps may be utilized. When the impregnated carrier is calcined, the Group VIB and Group VIII metals are converted to the corresponding metal oxides. Formation of a catalyst wherein the metals are in the sulfide form can be effected in any known manner. One satisfactory procedure is to contact the catalyst containing the oxides of the metals with a mixture of hydrogen sulfide and hydrogen at elevated temperatures. Complete sulfiding is not necessary, but generally, sulfiding to above about 5% is desirable.

Any foraminous carrier or support can be utilized in the preparation of the catalyst of the present invention, and the election of any particular carrier generally will depend upon the intended use of the catalyst and the particular preferences of those skilled in the art. The catalyst support may be prepared generally by forming, e.g., extruding, aqueous mixtures comprising silica, alumina or mixtures of silica and alumina in water, and thereafter drying and calcining the extruded mixture. All types of aluminas can be used in the preparation of the carrier. Thus, the aluminas may be suitable pseudoboehmites and/or alpha-monohydrates with or without mixtures of calcined aluminas. The silica used to form catalyst supports may be silica, silicic acid, silica sols, silica-alumina, fluosilicic acid, etc. Other materials may be incorporated into the catalyst support such as halogens and mineral acids.

The size and shape of the foraminous support can be varied over a wide range. For extruded supports, the size generally is from about 1/64-inch to about ½-inch in diameter. The shape of the support can be in the form of extruded briquettes, or tabletted cylinders, polylobal extrusions, spheres, rings, hollow core cylinders or any other appropriate geometric shape. The different forming techniques may require mixes with different water contents.

Impregnation of the carrier (generally calcined) with the aqueous solutions of the present invention can be effected by any known technique such as by mixing the calcined carder with a given amount of the aqueous solution for a given period of time. The incipient wetness technique is particularly useful. The solution penetrates into the carder and fills the pores of the carrier. After the carrier support has been impregnated with the solution containing the Group VIB and Group VIII metals, the impregnated support may be dried and calcined to convert the metals to metal oxides. Any type of drier and drying temperature can be used so long as the extrudates are dried sufficiently so that they will not break up on calcination. It is possible in some instances to effect a one-step drying-calcination if a proper time-temperature cycle is established. Calcination temperatures of at least about 400° C. and up to 800° C. can be used. Any type of calciner such as a rotary kiln, tunnel kiln, vertical calciner, etc., can be used as long as the metals are converted to metal oxides.

It is also possible in some instances, to prepare the catalyst by combining the stabilized aqueous solutions of the present invention with the components of the carrier into a mix followed by forming, drying and calcination.

Catalysts prepared in accordance with the method of the present invention can be utilized in a variety of processes including hydrogenation, dehydrogenation, oxidation, desulfurization, hydrodesulfurization, isomerization and cracking. In one embodiment, the catalysts are particularly useful in promoting hydrodesulfurization and other hydrogenating reactions. Hydrodesulfurization is the principal means by which the sulfur content of petroleum feedstocks are reduced. In this technique, the organic sulfur compounds are reacted with hydrogen in the presence of a hydrogenation catalyst to convert the sulfur to hydrogen sulfide which is more readily removed.

The catalysts of the present invention also are useful as hydrotreating catalysts in the upgrading of crude hydrocarbon oil stocks or partially hydrotreated crude stocks and in producing lubricating oils or lubricating oil base stocks by way of catalytic hydrogenation. The crude hydrocarbon oil stocks treated with the catalysts of the present invention may be any of the oil stocks commercially available and known in the art including gas oils and heavy gas oils. The crude lubricating oil stocks which may be hydrotreated with the catalysts of the present invention include oil stocks usually boiling predominantly above 315° C. (600° F.) and include stocks ranging from light distillates to heavy gas oils obtained from vacuum or atmospheric towers.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A method of preparing a catalyst comprising at least one first metal or metal oxide selected from molybdenum and tungsten and at least one Group VIII metal or metal oxide which comprises the steps of (A) impregnating a foraminous carrier with an aqueous solution comprising water, at least one first element selected from molybdenum and tungsten, at least one Group VIII element, an inorganic phosphorus-containing acid, and an amount of a reducing agent selected from hydrazine compounds or hydroxylamine compounds effective to dissolve the first and Group VIII elements and stabilize the solution, wherein said first and Group VIII elements are present as salts capable of being converted to their oxides upon calcination, wherein the solution used in step (A) contains a sufficient amount of the first and Group VIII metal salts to provide a catalyst containing from about 10% to about 35% by weight of combined metal; and (B) thereafter drying and calcining the impregnated carrier to convert the first and Group VIII elements to their oxides.

2. The method of claim 1 wherein the first element is selected from molybdenum and the Group VIII element is selected from nickel and cobalt.

3. The method of claim 1 wherein the inorganic phosphorus acid is orthophosphoric acid.

4. The method of claim 1 wherein the reducing agent is hydrazine.

5. The method of claim 1 wherein the reducing agent is hydroxylamine phosphate.

6. A stabilized aqueous solution for use in preparing catalysts comprising water, at least one first element selected from molybdenum and tungsten, at least one Group VIII element, an inorganic phosphorus-containing acid, and an amount of a reducing agent selected from hydrazine compounds or hydroxylamine compounds effective to dissolve the first and Group VIII elements and stabilize the solution, wherein the solution contains a sufficient amount of the first and Group VIII metal salts to provide a catalyst containing from about 10% to about 35% by weight of combined metal.

7. The method of claim 1 wherein the first element is derived from molybdenum trioxide and the Group VIII element is derived from nickel carbonate.

8. The stabilized aqueous solution of claim 6 wherein the Group VIII element is nickel or cobalt.

9. The stabilized aqueous solution of claim 6 wherein the first element is molybdenum and the Group VIII element is nickel.

10. The stabilized aqueous solution of claim 6 wherein the phosphorus-containing acid is orthophosphoric acid.

11. The stabilized aqueous solution of claim 6 wherein the hydrazine compound is characterized by the formula $$R_1N(H)-N(R_2)R_3 \tag{I}$$

wherein $R_1$, $R_2$ and $R_3$ are each independently hydrogen, hydrocarbyl or hydroxyhydrocarbyl groups.

12. The stabilized aqueous solution of claim 6 wherein the hydrazine compound is hydrazine.

13. The stabilized aqueous solution of claim 6 wherein the hydroxylamine compound is a hydroxylamine salt.

14. The stabilized aqueous solution of claim 6 wherein the hydroxylamine compound is hydroxylamine phosphate.

15. The stabilized aqueous solution of claim 6 containing from about 10 to about 30 weight percent of the first element and from about 1 to about 10 weight percent of the Group VIII element.

16. A stabilized aqueous solution for use in preparing catalysts wherein said solution is prepared by a process comprising admixing components comprising water, at least one first element selected from molybdenum and tungsten, at least one Group VIII element selected from nickel and cobalt, an inorganic phosphorus acid, and a sufficient amount of a reducing agent selected from hydrazine or hydroxylamine phosphate to dissolve the first and Group VIII elements and stabilize the solution, where the solution contains a sufficient amount of the first and Group VIII metal salts to provide a catalyst containing from about 10% to about 35% by weight of combined metal.

17. The stabilized aqueous solution of claim 16 wherein the first element is molybdenum.

18. The stabilized aqueous solution of claim 16 wherein the Group VIII element is nickel.

19. The stabilized aqueous solution of claim 16 wherein the first element is molybdenum and the Group VIII element is nickel.

20. The stabilized aqueous solution of claim 16 wherein the first element is molybdenum and the Group VIII element is cobalt.

21. The stabilized aqueous solution of claim 16 wherein the inorganic phosphorus acid is orthophosphoric acid.

22. The stabilized aqueous solution of claim 16 wherein the weight ratio of the first element to Group VIII element is from about 1:0.2 to about 1:1.

23. The stabilized aqueous solution of claim 16 containing from about 0.01 to about 10 weight percent of the reducing agent.

24. The stabilized aqueous solution of claim 16 wherein the reducing agent is hydrazine.

25. The stabilized aqueous solution of claim 24 containing from about 0.01 to about 1 weight percent of hydrazine.

26. The stabilized aqueous solution of claim 16 wherein the reducing agent is hydroxylamine phosphate.

27. A stabilized aqueous solution for use in preparing catalysts formed on admixing components comprising water, from about 10 to about 30 weight percent of molybdenum trioxide, from about 1 to about 10 weight percent nickel carbonate, from about 5 to about 15 weight percent of orthophosphoric acid and from about 0.05 to about 0.5 weight percent of hydrazine.

* * * * *